(12) United States Patent
Deckert (10) Patent No.: US 9,174,757 B2
(45) Date of Patent: Nov. 3, 2015

(54) METHOD FOR LABELING CONTAINERS IN A BEVERAGE BOTTLING PLANT AND A LABELING STATION FOR A LABELING MACHINE IN A BEVERAGE BOTTLE LABELING PLANT

(75) Inventor: Lutz Deckert, Haltern am See (DE)

(73) Assignee: KHS GmbH, Dortmund (DE)

(*) Notice: Subject to any disclaimer, the term of this patent is extended or adjusted under 35 U.S.C. 154(b) by 268 days.

(21) Appl. No.: 12/794,372

(22) Filed: Jun. 4, 2010

(65) Prior Publication Data

US 2010/0300614 A1 Dec. 2, 2010

Related U.S. Application Data (63) Continuation-in-part of application No. PCT/EP2008/010094, filed on Nov. 27, 2008.

(30) Foreign Application Priority Data

Dec. 7, 2007 (DE) .......................... 10 2007 059 244

(51) Int. Cl.
*B65C 3/12* (2006.01)
*B65C 9/18* (2006.01)
(Continued)

(52) U.S. Cl.
CPC ................. *B65C 9/1819* (2013.01); *B65C 9/22* (2013.01); *B32B 38/04* (2013.01);
(Continued)

(58) Field of Classification Search
CPC ........ B32B 37/06; B32B 37/12; B32B 38/04; B65C 9/18; B65C 9/22; B65C 9/05; B65C 9/06; B65C 9/04; B65C 9/2204; B65C 1/04; B65C 2009/0071; B65C 2009/1838; B65C 2009/1857; B65C 3/163; B05B 1/02; B05B 1/14; B05D 5/16; Y10T 156/1062; Y10T 156/1084; Y10T 156/1085; Y10T 156/1317; Y10T 156/1326; Y10T 156/1339; Y10T 156/1378; Y10T 156/1734; Y10T 156/1798; B26C 65/45; B26C 65/4815; B26C 65/521

USPC ......... 156/521, 529, 160, 257, 264, 285, 291, 156/356, 358, 494, 495; 427/208.2, 208.6; 239/95, 103
See application file for complete search history.

(56) References Cited

U.S. PATENT DOCUMENTS 2,984,245 A * 5/1961 Phillips, Jr. ..................... 131/94
3,235,433 A 2/1966 Cvacho et al.
(Continued)

FOREIGN PATENT DOCUMENTS

DE         44 17 707 A1     11/1995
DE     20 2006 012400 U1    3/2007
(Continued)

OTHER PUBLICATIONS

International Search Report PCT/EP2008/010094 and English translation thereof.
(Continued)

*Primary Examiner* — Linda L Gray
(74) *Attorney, Agent, or Firm* — Nils H. Ljungman & Associates (57) ABSTRACT

A method for labeling containers in a beverage bottling plant and a labeling station for a labeling machine in a beverage bottle labeling plant. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 4 Drawing Sheets

(51) Int. Cl.
*B65C 9/22* (2006.01)
*B32B 38/04* (2006.01)

(52) U.S. Cl.
CPC ..... *Y10T 156/1062* (2015.01); *Y10T 156/1084* (2015.01); *Y10T 156/1317* (2015.01); *Y10T 156/1326* (2015.01); *Y10T 156/1339* (2015.01); *Y10T 156/1374* (2015.01); *Y10T 156/1734* (2015.01)

(56) References Cited

U.S. PATENT DOCUMENTS 4,277,301 A 7/1981 McIntyre et al.
2007/0034340 A1* 2/2007 Kaczkowski ................. 156/521
2008/0014344 A1* 1/2008 Fort et al. ................... 427/207.1

FOREIGN PATENT DOCUMENTS

| | | |
|---|---|---|
| DE | 10 2005 058374 A1 | 6/2007 |
| GB | 2 053 740 A | 2/1981 |
| JP | 08-133249 | 5/1996 |
| JP | 2002210526 A | 7/2002 |
| JP | 04-040257 B2 | 1/2008 |
| UA | 74 721 C2 | 12/2005 |
| WO | WO 2005/115847 A | 12/2005 |

OTHER PUBLICATIONS

German Office Action 10 2007 059 244.4-27.

* cited by examiner

METHOD FOR LABELING CONTAINERS IN A BEVERAGE BOTTLING PLANT AND A LABELING STATION FOR A LABELING MACHINE IN A BEVERAGE BOTTLE LABELING PLANT

CONTINUING APPLICATION DATA

This application is a Continuation-In-Part application of International Patent Application No. PCT/EP2008/010094, filed on Nov. 27, 2008, which claims priority from Federal Republic of Germany Patent Application No. 10 2007 059 244.4, filed on Dec. 7, 2007. International Patent Application No. PCT/EP2008/010094 was pending as of the filing date of this application. The United States was an elected state in International Patent Application No. PCT/EP2008/010094.

BACKGROUND

1. Technical Field

The present application relates to a method for labeling containers in a beverage bottling plant and a labeling station for a labeling machine in a beverage bottle labeling plant.

2. Background Information

Background information is for informational purposes only and does not necessarily admit that subsequently mentioned information and publications are prior art.

The present application relates to a method and to a labeling station for labeling bottles or similar containers with labels, which are produced by separating a length corresponding to one label at a time from a web or strip-shaped labeling material (roll material).

In state of the art methods and labeling stations of this type, the labels separated from the web or strip-shaped labeling material and held on a transfer element, for example on a transfer drum or vacuum drum, are glued and then transferred from the transfer element to the containers passing by it, where they are affixed. Especially in the case of all-round labeling, strip-shaped applications of glue, for example, are applied to the reverse side of the labels at the leading side or edge during transfer and on the trailing side or edge during transfer of each label. The application of the labels to the containers is then effected by winding on as the containers are rotated about their axis.

The application of the glue onto the labels held on the transfer cylinder is effected either by a glue roller arranged on the periphery of the transfer drum, not rotating with the drum, or by glue application heads with which the glue is applied to the labels either in a contact method, i.e. by glue application heads abutting against the labels, or in a contactless method, i.e. by glue application heads distanced from the labels.

At least when using glue rollers, it is desired that the receiving areas formed on the regular cylindrical peripheral area of the transfer drum for the labels each form raised areas on their leading and trailing ends in the direction of rotation of the transfer drum, against which the labels abut with their respective ends or edges, so that the respective glue application occurs on these ends or edges. These raised areas mean more expensive construction and make it difficult to convert to different label lengths.

One substantial limitation of some methods, however, is also the risk that when applying glue, the glue-applying functional elements touching the labels, i.e. glue rollers or glue application heads, which abut on the respective label during application of glue, may displace the labels on the transfer drum or the labels may even lose contact, wholly or partly, with this drum.

A further limitation of some methods is also that the glue-applying functional elements are covered by the respective label for part of the time, but not, for example, between two consecutive labels on the transfer drum, which results in a considerable soiling of the transfer drum by glue. This is the case when glue rollers are used, but also when glue application heads are used and when using contactless application heads, where there is the risk of soiling, e.g. due to glue swirls, etc. Soiling incidents lead to functional problems in the respective labeling machine and also mean that long stoppage times may occur for cleaning.

The use of glue rollers also has the limitation that the glue is exposed to the ambient air over a very large area, so that when hot glue is used, the components thereof volatilize and may precipitate on adjacent parts or functional elements of the labeling station. Also, when there is volatilization of components of the hot glue, the quality of this glue is adversely affected.

Glue application heads which enable contactless application of the glue have the further limitation of a complicated and time-consuming adjustment of these application heads, not least due to the fact that the respectively desired glue application is achieved when there is an optimally accurate arrangement and orientation of the application heads, at the same time maintaining an exact, substantially exact, or essentially exact clearance between the respective application head and the labels.

The present application relates to a method for labeling bottles or similar containers using a web or strip-shaped labeling material. The labels that are to be applied to the containers are produced by separation from the labeling material. Each label is provided with at least one application of glue. The labels are transferred by means of a transfer element to the containers passing by the transfer element. The respective application of glue onto the labeling material occurs before separation of the labels, using at least one glue application head. The present application also relates to a labeling station of a labeling machine. The labeling station has at least one application head designed to dispense the glue in a heated condition, for example, to dispense hot glue.

OBJECT OR OBJECTS

An object of the present application is to demonstrate a method which minimizes the aforementioned limitations and which, without the risk of soiling the labeling station used or its functional elements, can be used to apply glue with maximized accuracy when using a web or strip-shaped labeling material.

SUMMARY

In order to achieve this object, the present application discloses a method for labeling bottles or similar containers using a web or strip-shaped labeling material. The labels that are to be applied to the containers are produced by separation from the labeling material. Each label is provided with at least one application of glue. The labels are transferred by means of a transfer element to the containers passing by the transfer element. The respective application of glue onto the labeling material occurs before separation of the labels, using at least one glue application head. Also in seeking to achieve this object, the present application discloses a labeling station of a labeling machine. The labeling station has at least one application head designed to dispense the glue in a heated condition, for example, to dispense hot glue.

One feature of the present application is that the glue is applied onto the web or strip-shaped labeling material prior to the separation of the labels from this material. The glue is applied with at least one nozzle-type glue application head, and, in at least one possible embodiment of the present application using a glue application head which, at least during the application, is in contact with the labeling material. Using the respective glue application head, for example, very narrow strip-shaped glue applications, e.g. with a breadth of one millimeter to two millimeters, saving glue and with maximized accuracy, even when the labeling station or the labeling machine is high-output (high number of labeled containers per unit of time) can be achieved without any problem. The glue-applying functional element, namely the glue application head or at least one nozzle thereof, is covered by the labeling material at all times, virtually all times, or substantially all times during operation of the labeling station. This effectively minimizes any soiling of functional elements of this station with glue or glue components.

The glue application head used is, in at least one possible embodiment, designed so that it can apply glue intermittently, for example to produce narrow, strip-shaped glue applications, but continuous application of the glue is also possible, in the latter case in order to obtain labels which are provided, on their reverse side, with a glue application extending over the entire length of the label. Here, too, a feature of the present application resides in the fact that this glue application extending over the entire length of the label is effected with maximized accuracy and minimizes any soiling of functional elements of the labeling station.

In one possible embodiment, the glue application head used is designed as a slotted nozzle, and, in this possible embodiment, is designed as a slotted nozzle in which both the length and the breadth of the nozzle slot is determined by a mask, so that e.g. the breadth of the respective glue application can be varied in the axial direction perpendicular, virtually perpendicular, or substantially perpendicular to the longitudinal extension of the labeling material and/or adapted to the corresponding breadth of the labeling material by the insertion of different masks.

If the glue is applied intermittently, by selectively turning on and off the glue application head, taking account of the breadth of the nozzle gap, the breadth of the glue application running in the form of a strip, perpendicular, virtually perpendicular, substantially perpendicular, or essentially perpendicular to the longitudinal extension of the labeling material, can be controlled and/or varied without any problem.

At least during the application of the glue, the labeling material, in at least one possible embodiment of the present application, abuts on the glue application head with a contact pressure. This contact pressure is generated, for example, by the web tension exhibited by the labeling material in the area of the glue application head, or else due to the fact that the labeling material, on the side facing away from the glue application head, is pressed by a clamping element, for example a pressure roller, against the glue application head.

Refinements, developments, and possible applications of the present application will become apparent from the following description of embodiments and from the figures. At the same time all or substantially all the features described and/or illustrated per se or in any combination are in principle the subject matter of the present application.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application will next be explained in more detail with the aid of the figures showing one possible embodiment.

DESCRIPTION OF EMBODIMENT OR EMBODIMENTS

Figure 1:
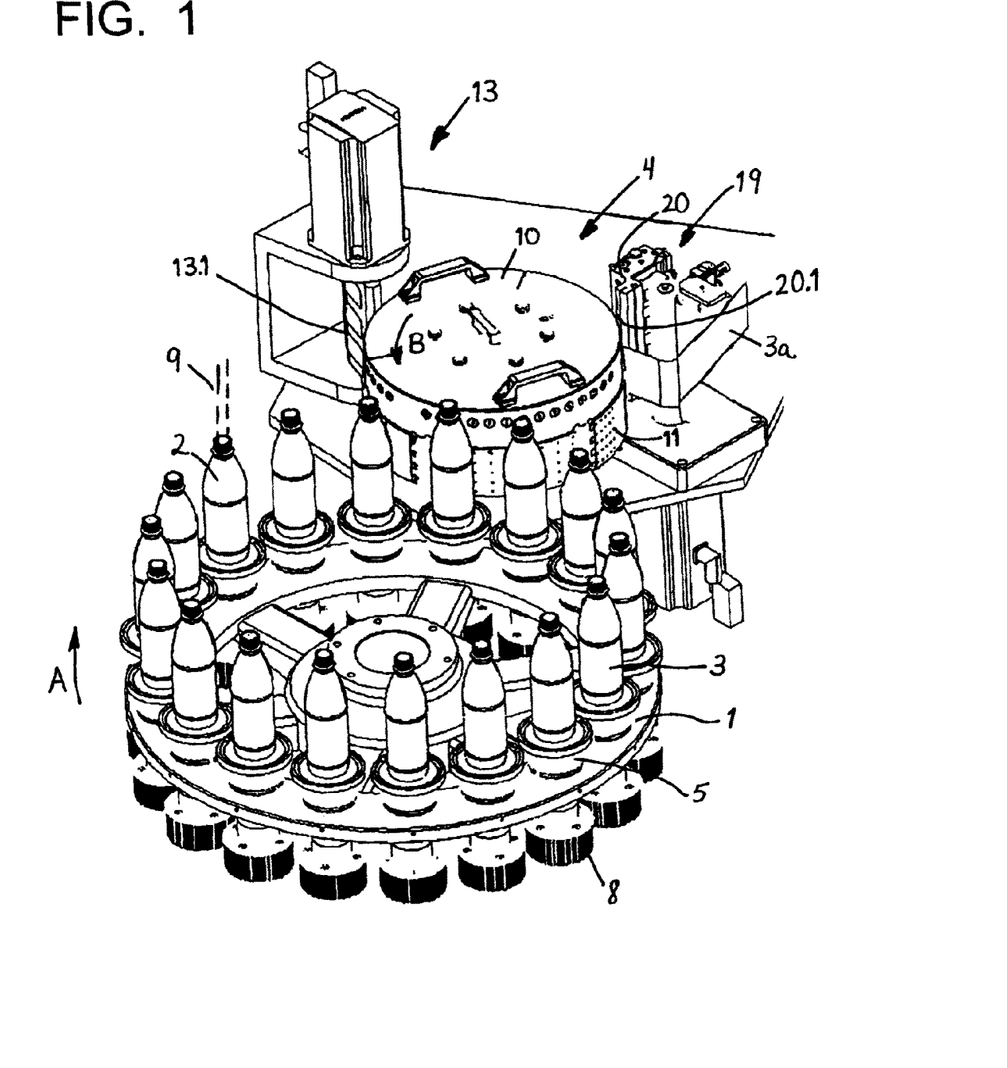
FIG. 1 shows, in perspectival partial view, the rotor of a rotary-type labeling machine together with a partial view of a labeling station.
Figure 2:
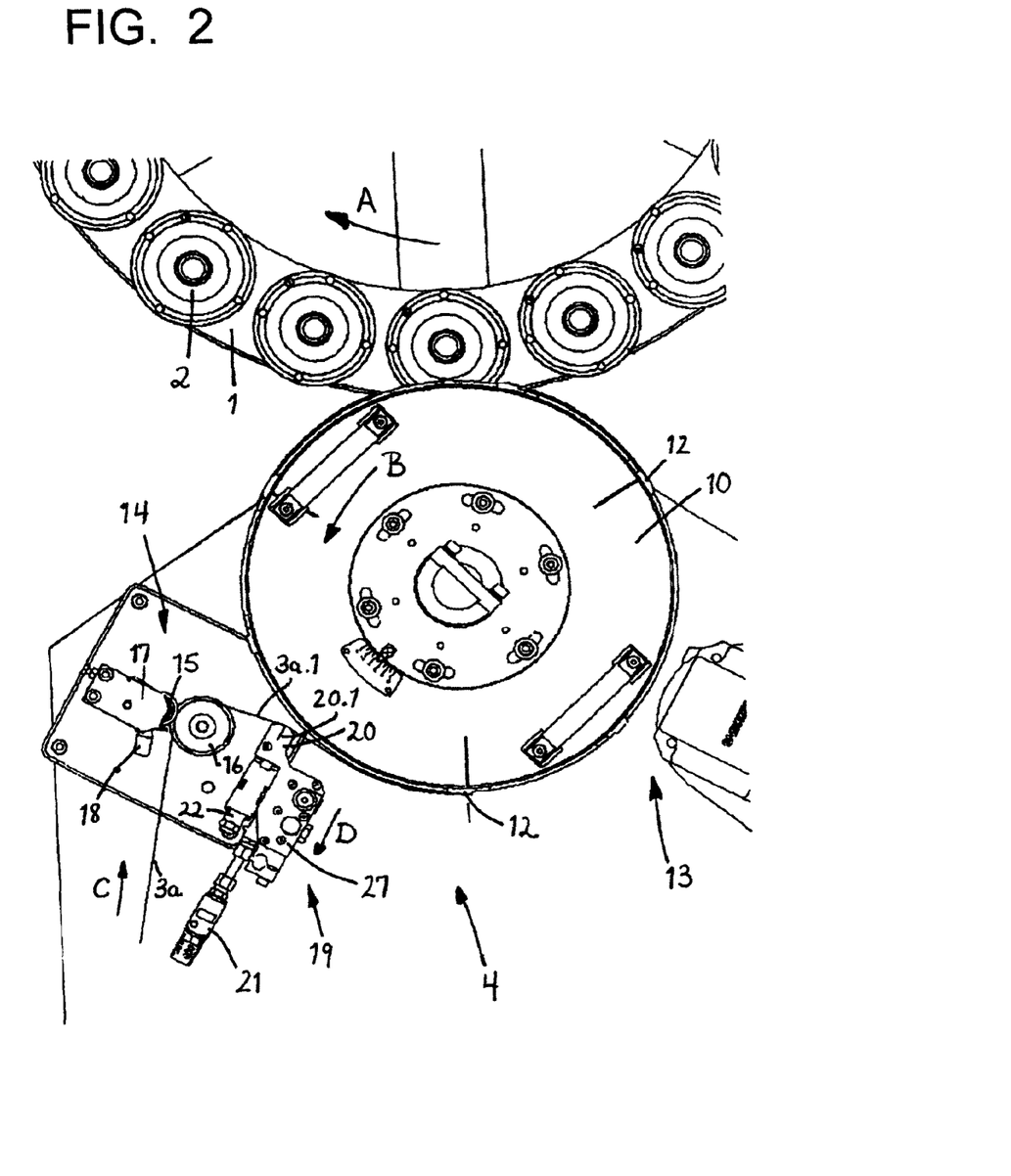
FIG. 2 shows the labeling station together with the rotor in top view.

In the figures, 1 is the rotary-driven rotor of a rotary-type labeling machine rotating about a vertical, substantially vertical, or essentially vertical machine axis in the direction of the arrow A for labeling bottles 2 with an all-round label 3. The number 4 refers to a labeling station (labeling device) which is provided at the periphery of the rotor 1, not rotating with this latter, and is used to apply labels 3 onto the bottles 2 arranged standing upright with their bases on container carriers 5 (bottle pads) and moved by the rotor 1 past the labeling device 4.

Figure 3:
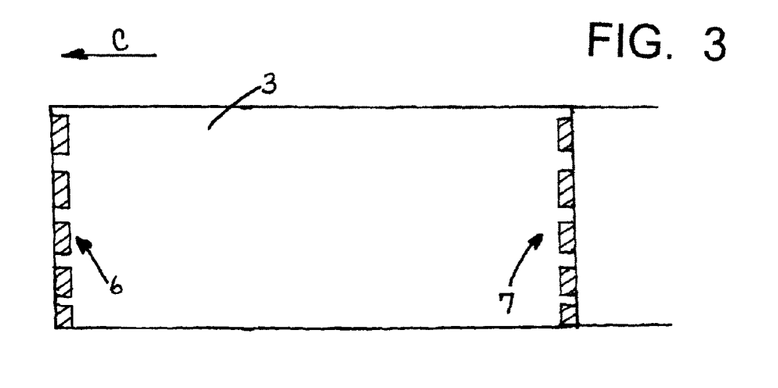
FIG. 3 shows, in a simplified view, a label to which glue has been applied following separation from the labeling material.

For transfer to the bottles 2 and fixation thereon, the rectangular labels 3 in the labeling device 4 are provided during transfer to a bottle 2, on their leading narrow side and on the narrow side trailing during the transfer, with a strip-shaped application of glue 6 and 7 respectively, and this is on the reverse of the labels, so that with the leading glue application 6 each label 3 adheres to a bottle 2 to be labeled and then, as the bottle 2 concerned is rotated about its vertical, substantially vertical, or essentially vertical axis, the label 3 is wound onto the bottle 2 or the body of the bottle and fixed onto the bottle with the trailing glue application 7 so as to overlap. The container carriers 5 each have a drive 8 for rotating the bottles 2. Furthermore, the bottles 2 are secured against falling over on the container carriers 5 by stays, one of which is shown diagrammatically in FIG. 1, indicated by dotted lines 9. The bottles 2 to be labeled are fed to the rotor 1 or the container carriers 5 at a bottle intake and the labeled bottles 2 are taken from the rotor 1 at a bottle out-take.

The individual labels 3 are produced in the labeling device 4 by being separated from a web or strip-shaped labeling material 3a and thereby, prior to this separation, provided with the front and rear application of glue 6 and 7 respectively. In order, inter alia, to reduce glue consumption, the applications of glue 6 and 7, interrupted in the embodiment shown, are carried out in such a way that they each comprise several spots of glue, arranged in a row extending vertically, substantially vertically, or essentially vertically, i.e. in a row parallel, virtually parallel, essentially parallel, or substantially parallel to the respective narrow side of the label 3.

In at least one possible embodiment of the present application, the several spots of glue being applied to the labeling material 3a may extend vertically somewhat beyond the edges of the label material 3a. Because the application of glue 6 and 7 may be performed upstream of the cutting station and prior to the separation of labels 3 from the labeling material 3a, to thereby minimize glue from contacting other components of the labeling machine.

The labeling device 4 includes i.a. a transfer drum 10 in the form of a vacuum drum, which is driveable in rotation synchronously with the rotor 1 about an axis parallel, virtually parallel, essentially parallel, or substantially parallel to the rotor axis, in the direction of arrow B and hence counter to the direction of rotation of the rotor 1. The transfer drum 10 forms, on its regular cylindrical circumferential area concentrically surrounding the drum axis, a plurality of label receiving areas in sequence in the direction of rotation B, each having several openings 11, which are chiefly vacuum openings, but some of which are also openings for the controlled output of compressed air, and these are for the transfer of the respective label onto a bottle 2. There is also a cutter strip 12 assigned to each label receiving area, which interacts with a blade 13.1 arranged on the periphery of the drum 10 and does not rotate with this drum, to form a cutting station 13, for example with a rotating blade, serving to separate the labels 3 from the labeling material 3a held at the periphery of the drum 10.

In at least one possible embodiment of the present application, by applying glue before cutting the labeling material 3a into individual labels 3, chances of getting glue on the wrong side of the labels 3 and/or labeling material 3a are restricted and/or minimized. This method of applying glue may reduce contamination of the vacuum drum 10 and consequently on the other side of the labels 3 and/or labeling material 3a. If glue were to contact the other side of the labels 3 and/or labeling material 3, the labels 3 may stick to the vacuum drum 10 and/or the labels 3 on the bottles 2 may then stick to each other. Also, glue on the vacuum drum would diminish the vacuum and functionality of the vacuum drum 10 by clogging the openings 11 on the vacuum drum 10.

In one possible embodiment of the present application, the cutting station may comprise the blade 13.1. The blade 13.1 may not rotate with the transfer drum or vacuum drum 10. The blade 13.1 may rotate independently of the transfer drum or vacuum drum 10. In another possible embodiment, the blade 13.1 may be stationary with respect to the transfer drum or vacuum drum 10. The blade 13.1 may interact with the cutting strips or anvils 12 on the transfer drum or vacuum drum 10 to cut and separate labels 3 from the labeling material 3a.

The labeling material 3a is drawn in a controlled fashion from a stock (roll of labels), not shown, in the direction of arrow C, by means of an infeed unit 14, comprising essentially two rollers 15 and 16, oriented with their axes parallel, virtually parallel, essentially parallel, or substantially parallel to each other and also parallel, virtually parallel, essentially parallel, or substantially parallel to the axis of the transfer drum 10 and of which the roller 16 is driven in rotation about its axis by the drive of the labeling station 4. The roller 15 is freely rotatably supported in a frame 17 and adjustable by an actuator, for example a pneumatic actuator 18. The two rollers 16 and 17 form a conveyor gap between them, through which the labeling material 3a is guided edgewise, i.e. oriented in a vertical, substantially vertical, or essentially vertical plane, so that when the roller 15 is adjusted and the roller 16 is driven in rotation, the labeling material 3a is drawn from the stock synchronously with the rotary movement of the transfer drum 10. In the embodiment shown, the label material 3a encompasses the roller 16 over an angular range of approximately 90 degrees and then runs with a partial length 3a.1 starting from the roller 16 in a substantially tangential manner to the peripheral area of the transfer drum 10. The infeed unit 14 conveys the labeling material in the right length to the drum 10 and is in fact controlled, for example, by cutting markings present on the labeling material 3a, which are scanned by a sensor unit, not shown.

Between the roller 16 and the transfer drum 10, a gluing unit 19 with a slotted nozzle 20 is provided, in such a way that the partial length 3a.1 of the labeling material 3a with the reverse side of the labels, against which a glue dispensing area with a nozzle slit with multiple interruptions 20.1 abuts with a contact pressure resulting from the web tension, and this is due, among other things, to the fact that the partial length 3a.1 is slightly deflected at the slotted nozzle 20 and the conveying speed of the infeed device 14 is somewhat reduced compared with the conveying or peripheral speed of the transfer drum 10.

As shown, the slotted nozzle 20 abuts on the side of the labeling material 3a facing away from the transfer drum 10. The applications of glue 6 and 7 each occur outside the transfer drum 10, in any case, however, before the labeling material 3a carried along with the transfer drum 10 reaches the cutting station 13 formed by the cutter 13.1.

Figures 4, 5:
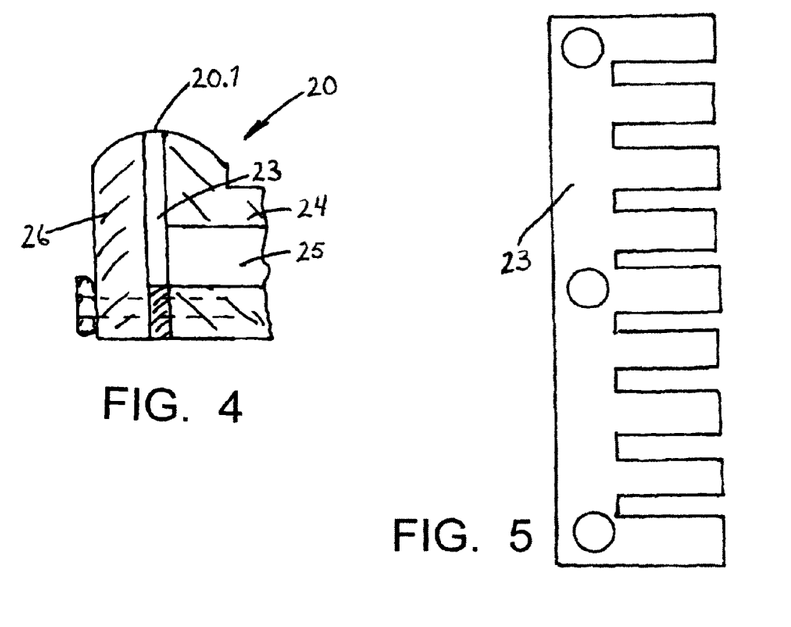
FIG. 4 shows, in partial view, a section through a slit nozzle forming the glue application head of the labeling station.
FIG. 5 shows, in detail view, a diaphragm for use with the slit nozzle from FIG. 3.

The supply of hot glue (e.g. hot glue or hot melt glue) to the slotted nozzle 20 is provided by means of a supply unit, not shown, via a hose 21. In at least one possible embodiment of the present application, the slotted nozzle 20 may be heated. In at least one possible embodiment, the hose 21 may also be heated. An electrically or pneumatically controlled valve 22, for example, is provided at the slotted nozzle 20 or in the area of the inlet to this slotted nozzle, and said valve opens and closes the connection between the glue infeed (hose 21) and the gap or slot 20.1 with multiple interruptions in a pulsed manner for the applications of glue 6 and 7.

The slot 20.1 with multiple interruptions extending parallel, virtually parallel, essentially parallel, or substantially parallel to the axis of the drum 10 is, for example, formed by a comb-like screen plate 23, which is provided between a nozzle housing part 24, which forms a glue chamber 25 controlled by the valve 22, and a closing plate 26 clamped by appropriate means, for example by straining screws, in such a way that the screen plate 23 determines the breadth of the slot 20.1 by its sheet thickness and through its comb-like structure forms the slot 20.1 with multiple interruptions connected with the glue chamber 25 and closed on the top and bottom side of the slotted nozzle 20. By using different masks or screen plates 23 it is easy to adapt the slotted nozzle 20 to different breadths of the labeling material 3a. Likewise, by using screen plates 23 of different thicknesses, the breadth of the slot 20.1 can also be adjusted, and/or by using screen plates 23 without a comb structure, slots 20.1 are possible which have no interruptions.

By using the valve 22 provided directly on the slotted nozzle 20, it is possible for the glue to be dispensed intermittently almost instantly, so that even in a high-output labeling station 4 or labeling machine, i.e. at a high number of labeled bottles 2 per unit of time, very narrow and exact, substantially exact, or essentially exact applications of glue 6 and 7 can be achieved.

The slotted nozzle 20 is in at least one possible embodiment, arranged on a carrier 27 in such a way that it can be moved away from the labeling material 3a or from the length 3a.1, as indicated in FIG. 2 by the arrow D, and this is in order to minimize overheating of the labeling material 3a by the slotted nozzle 20 when the labeling station 4 is at a standstill. The slotted nozzle 20 is, in at least one possible embodiment of the present application, moved or pivoted away from the labeling material 3a automatically when the conveying of the labeling material 3a by the infeed unit 14 is interrupted over a predefined period of time.

In at least one possible embodiment of the present application, the carrier 27 may be adjustable with respect to labeling material 3a. The result of the applications of glue 6 and 7 onto the labeling material 3a prior to separation into the individual labels 3, is, among other things, to minimize soiling of the labeling station 4. Furthermore, even with a high output, optimally accurate applications of glue 6 and 7 in relation to the front and rear edges of the labels 3 are achieved.

In the embodiment shown, the glue is supplied to the slotted nozzle 20 via the hose 21, without the excess glue being carried back to the supply unit. This minimizes multiple heating and resultant quality losses of the glue.

The present application has been described above on the basis of one embodiment. Obviously numerous modifications and alterations are possible, without departing from the principle on which the present application is based.

Hence it has been assumed in the foregoing that strip-shaped applications of glue 6 and 7 are produced by intermittent triggering of the valve 22. In principle, there is obviously also the option, by corresponding triggering of the valve 22, of making applications of glue in more or less any application pattern, for example a continuous or constant, substantially constant, or essentially constant application of glue. Common to all or substantially all embodiments, however, is the fact that the application of glue onto the labeling material 3a occurs before separation into the individual labels 3.

In the foregoing it has been assumed that the applications of glue, for example the applications of glue 6 and 7, are made on partial lengths 3a.1, before the labeling material 3a is taken up by the transfer drum 10. In principle, there is also the option of making the applications of glue onto the labeling material already taken over by the transfer drum 10, i.e. of providing the slotted nozzle 20 peripherally on the transfer drum 10, but in the direction of rotation B of the transfer drum 10 upstream of the cutting station 13, so that the application of glue again occurs before separating the labels 3.

It has further been assumed in the foregoing that the desired contact pressure of the labeling material 3a against the slotted nozzle 20 is generated by the web tensioning of the labeling material 3a or the part length 3a.1. In principle, there is also the option of generating the contact pressure of the labeling material 3a by an additional pressure element, for example by a pressure roller, which abuts on the side of the labeling material 3a facing away from the slotted nozzle 20 and presses this material against the slotted nozzle 20.

If the respective application of glue is made on the transfer drum 10 or on the labeling material 3a held there, the desired contact pressure is generated, for example, by a sprung arrangement of the slotted nozzle 20.

In principle, there is also the option, with corresponding design of the slotted nozzle, of generating the respective application of glue with the slotted nozzle at a slight distance from the labeling material.

Figure 6:
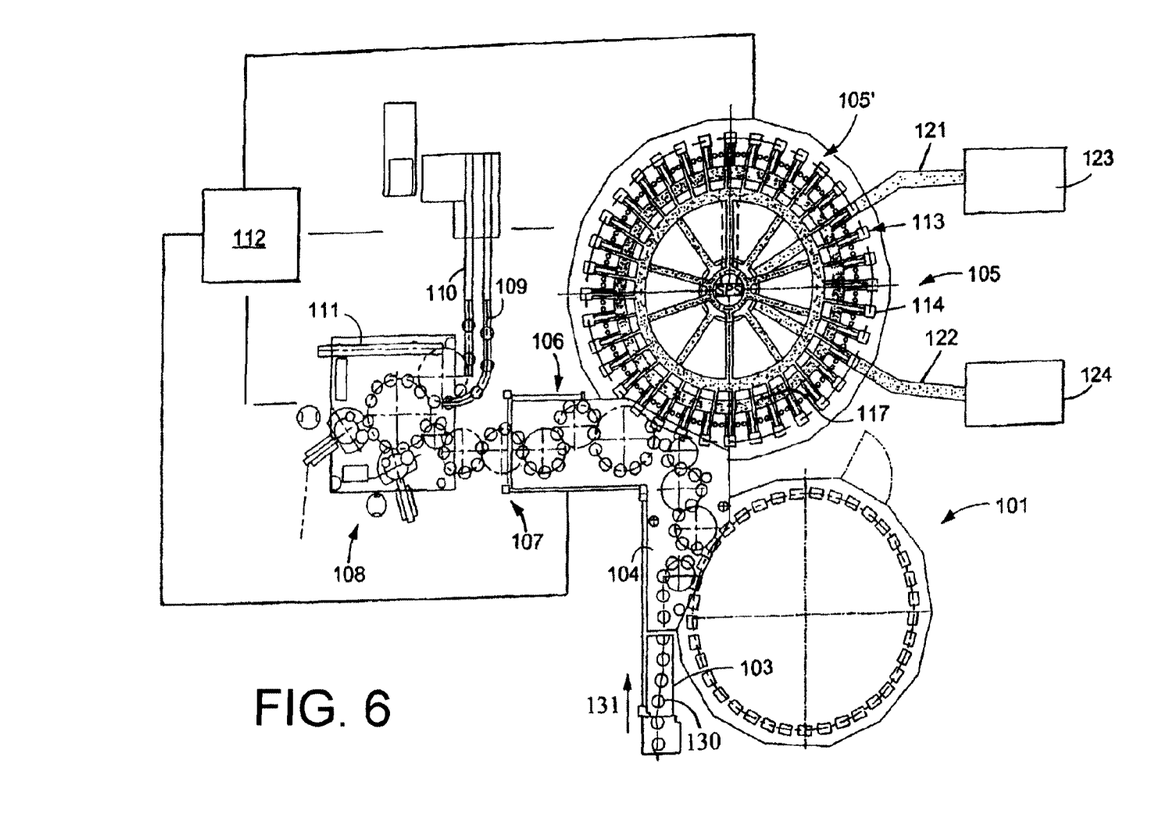
FIG. 6 shows schematically the main components of one possible embodiment example of a system for filling containers, for example, a beverage bottling plant for filling bottles with at least one liquid beverage, in accordance with at least one possible embodiment, in which system or plant could possibly be utilized at least one aspect, or several aspects, of the embodiments disclosed herein.

FIG. 6 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 6 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 6, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyer arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The present application relates to a method for labeling bottles or similar containers 2 using a web or strip-shaped labeling material 3a, from which the labels 3 that are to be applied to the containers 2 are produced by separation, wherein the glued labels are transferred by means of a transfer element 10 to the containers 2 passing by the transfer element after separation from the labeling material. The application 19 of the glue on the labeling material is carried out before the separation of the labels.

One feature or aspect of an embodiment is believed at the time of the filing of this patent application to possibly reside broadly in a method for labeling bottles or similar containers 2 using a web or strip-shaped labeling material 3a, wherein the labels 3 that are to be applied to the containers 2 are produced by separation from the labeling material 3a and each provided with at least one application of glue 6, 7, transferred by means of a transfer element 10 to the containers 2 passing by the transfer element 10, wherein the respective application of glue 6, 7 onto the labeling material 3a occurs before separation of the labels 3, using at least one glue application head 20.

Another feature or aspect of an embodiment is believed at the time of the filing of this patent application to possibly reside broadly in the method, wherein the web or strip-shaped labeling material 3a is fed to the transfer element 10, and that the labels 3 are separated from the labeling material 3a on the transfer element 10.

Yet another feature or aspect of an embodiment is believed at the time of the filing of this patent application to possibly reside broadly in the method, wherein a transfer drum 10 is used as transfer element, in at least one possible embodiment of the present application, a vacuum drum, which is driven in rotation about a drum axis, in at least one embodiment about a vertical, substantially vertical, or essentially vertical drum axis.

Still another feature or aspect of an embodiment is believed at the time of the filing of this patent application to possibly reside broadly in the method according to the present application, wherein the respective application of glue 6, 7 onto the labeling material 3a occurs in a conveying or infeed direction C of this material upstream of the transfer element 10.

A further feature or aspect of an embodiment is believed at the time of the filing of this patent application to possibly reside broadly in the method according to the present application, wherein the respective application of glue 6, 7 is made onto the labeling material 3a held on the transfer element 10.

Another feature or aspect of an embodiment is believed at the time of the filing of this patent application to possibly reside broadly in the method according to the present application, wherein the respective application of glue 6, 7 onto the labeling material 3a by intermittently triggering the at least one glue application head 20 or by intermittent dispensing of glue occurs in such a way that the labels 3, after separation from the labeling material 3a, are each partially provided, on their leading and/or trailing end during the transfer to the containers 2, with an application of glue 6, 7, in at least one possible embodiment, with an application of glue running parallel, virtually parallel, essentially parallel, or substantially parallel to this end or to this edge.

Yet another feature or aspect of an embodiment is believed at the time of the filing of this patent application to possibly reside broadly in the method according to the present application, wherein the labels 3, after separation from the labeling material 3a, are provided with at least one application of glue, which extends between the leading and trailing edges of the labels 3 during the transfer onto the containers.

Still another feature or aspect of an embodiment is believed at the time of the filing of this patent application to possibly reside broadly in the method according to the present application, wherein a nozzle is used as glue application head, for example a slotted nozzle 20.

A further feature or aspect of an embodiment is believed at the time of the filing of this patent application to possibly reside broadly in the method according to the present application, wherein a nozzle is used as glue application head, for example a slotted nozzle 20 with several nozzle apertures arranged in a row.

Another feature or aspect of an embodiment is believed at the time of the filing of this patent application to possibly reside broadly in Method according to the present application, wherein the labeling material 3a abuts on the at least one glue application head 20 with a contact pressure.

Yet another feature or aspect of an embodiment is believed at the time of the filing of this patent application to possibly reside broadly in the method, wherein the contact pressure is generated by the web tension of the labeling material 3a in the area of the glue application head 20.

Another feature or aspect of an embodiment is believed at the time of the filing of this patent application to possibly reside broadly in the method, wherein the contact pressure is generated by an element pressing the labeling material 3a against the glue application head 20, for example by a pressure roller.

Yet another feature or aspect of an embodiment is believed at the time of the filing of this patent application to possibly reside broadly in the method according to the present application, wherein the glue is a hot glue or a hot melt glue.

Still another feature or aspect of an embodiment is believed at the time of the filing of this patent application to possibly reside broadly in the method according to the present application, wherein the at least one application head is heated.

A further feature or aspect of an embodiment is believed at the time of the filing of this patent application to possibly reside broadly in the method according to the present application, wherein when there is an interruption in the labeling process, the at least one glue application head 20 is moved and/or pivoted away from the labeling material 3*a*.

Another feature or aspect of an embodiment is believed at the time of the filing of this patent application to possibly reside broadly in a labeling station of a labeling machine for labeling bottles or similar containers 2 using a web or strip-shaped labeling material 3*a*, with at least one cutting station 13 for separating the labels from the labeling material 3*a*, with at least one gluing station or device 19 for applying a glue and with a transfer element 10 to transfer the glued labels 3 onto the containers 2 passing by the transfer element 10, wherein the gluing station 19 is formed by at least one nozzle-type glue application head 20, which is provided, in a transport direction C of the labeling material 3*a*, upstream of the cutting station 13.

Yet another feature or aspect of an embodiment is believed at the time of the filing of this patent application to possibly reside broadly in the labeling station, wherein the at least one glue application head 20 is designed to dispense the glue in heated condition, for example to dispense a hot glue.

Still another feature or aspect of an embodiment is believed at the time of the filing of this patent application to possibly reside broadly in the labeling station, wherein the at least one glue application head 20 is designed to dispense the glue under pressure.

A further feature or aspect of an embodiment is believed at the time of the filing of this patent application to possibly reside broadly in the labeling station according to the present application, wherein the at least one glue application head is formed from a slotted nozzle 20, which has at least one slot-type nozzle opening 20.1 or several nozzle openings arranged in at least one row.

Another feature or aspect of an embodiment is believed at the time of the filing of this patent application to possibly reside broadly in the labeling station, wherein the at least one nozzle opening 20.1 or the row of nozzle openings are oriented in an axial direction perpendicular, virtually perpendicular, substantially perpendicular, or essentially perpendicular to the longitudinal extension of the labeling material 3*a*.

Yet another feature or aspect of an embodiment is believed at the time of the filing of this patent application to possibly reside broadly in the labeling station according to the present application, wherein the at least one glue application head 20 is connected to a source to supply the glue under pressure.

Another feature or aspect of an embodiment is believed at the time of the filing of this patent application to possibly reside broadly in the labeling station according to the present application, wherein the at least one glue application head 20 is designed to dispense the glue in controlled fashion, in at least one possible embodiment for controlled intermittent glue dispensing with a control valve 22, for example with an electrically or pneumatically actuated control valve.

Yet another feature or aspect of an embodiment is believed at the time of the filing of this patent application to possibly reside broadly in the labeling station according to the present application, wherein the gluing station 19 with the at least one glue application head 20 is arranged, in the direction of travel of the labeling material 3*a*, upstream of the transfer element 10.

Still another feature or aspect of an embodiment is believed at the time of the filing of this patent application to possibly reside broadly in the labeling station according to the present application, wherein the at least one glue application head 20 is provided at the periphery of the transfer drum 10 and does not rotate with the latter.

A further feature or aspect of an embodiment is believed at the time of the filing of this patent application to possibly reside broadly in the labeling station according to the present application, wherein the transfer element is a transfer drum 10, for example a vacuum drum, driveable in rotation about a drum axis.

Another feature or aspect of an embodiment is believed at the time of the filing of this patent application to possibly reside broadly in the labeling station, wherein the cutting station 13 is provided at the periphery of the transfer drum 10 and does not rotate with the latter.

Yet another feature or aspect of an embodiment is believed at the time of the filing of this patent application to possibly reside broadly in the labeling station according to the present application, comprising at least one conveyor or infeed unit 14, via which the labeling material 3*a* is fed to the transfer element 10, while the at least one glue application head 20 is provided, in the direction of conveyance C of the labeling material 3*a*, between the conveyor or infeed unit 14 and the transfer element 10.

Still another feature or aspect of an embodiment is believed at the time of the filing of this patent application to possibly reside broadly in a method for labeling bottles or similar containers 2 using a web- or a band-shaped label material 3*a*, where the labels 3 to be applied to the containers 2 are produced by detachment from the label material 3*a*, and provided in each case with a glue application 6, 7 with a transfer element 10 to which containers 2 that are moving past on the transfer element 10 are transferred, where each glue application 6, 7 to the label material 3*a* occurs prior to and/or upstream of the detachment of the labels 3 with at least one glue application head 20, and where the label material 3*a* abuts against the at least one glue application head 20 with an application pressure, and where an intermittent application of the glue occurs by targeted switching on and switching off of the glue application head.

A further feature or aspect of an embodiment is believed at the time of the filing of this patent application to possibly reside broadly in a labeling station of a labeling machine for labeling bottles or similar containers 2 using a web- or band-shaped label material 3*a*, with at least one cutting station 13 for the detachment of the label from the label material 3*a*, with at least one gluing station or device 19 for the application of a glue as well as with a transfer element 10 for the transfer of the glue-coated labels 3 to the containers 2 which are moving past on the transfer element 10, where the gluing station 13 is formed from at least one nozzle-like glue application head 20 which is provided before the cutting station 13 in a transport direction C of the label material 3*a* and where the label material 3*a* abuts against the at least one glue application head 20 with an application pressure, and where the at least one glue application head 20 is configured for the controlled release of the glue, in one possible embodiment by controlled intermittent glue application with a control valve 22, for example with an electrically or pneumatically actuatable control valve.

One feature or aspect of an embodiment is believed at the time of the filing of this patent application to possibly reside broadly in a method of labeling beverage bottles with labels in a beverage bottle filling plant with a beverage bottle labeling machine; said method comprising the steps of: transporting filled, closed beverage bottles into said beverage bottle labeling machine; transporting filled, closed beverage bottles past a labeling arrangement of said beverage bottle labeling machine; unrolling a continuous strip of labeling material from a supply roll of labeling material; feeding said continuous strip of labeling material through said labeling arrangement; feeding said continuous strip of labeling material adjacent to a glue application nozzle of said labeling arrangement and abutting said glue application nozzle with said continuous strip of labeling material such that said continuous strip of labeling material contacts said glue application nozzle with an application pressure; pressurizing a supply of glue, which supply of glue is operatively connected to said glue application nozzle; opening a control valve and permitting the flow of glue through said glue application nozzle; closing said control valve and restricting the flow of glue through said glue application nozzle; applying glue intermittently and directly to said continuous strip of labeling material with said glue application nozzle and minimizing contamination of said beverage bottle labeling machine by glue; feeding said continuous strip of labeling material with glue applied thereon through said labeling arrangement with a vacuum drum; said glue application nozzle being disposed upstream of said vacuum drum in the direction of feeding of said continuous strip of labeling material; said glue application nozzle being disposed sufficiently far from said vacuum drum to minimize contamination of said vacuum drum by glue; said method further comprising the steps of: cutting said continuous strip of labeling material with a blade in a cutting station of said beverage bottle labeling machine after said step of applying glue intermittently and directly and producing individual labels from said continuous strip of labeling material; applying individual labels to filled, closed beverage bottles upon filled, closed beverage bottles being transported past said labeling arrangement of said beverage bottle labeling machine; and transporting filled, closed, labeled beverage bottles out of said beverage bottle labeling machine.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, except for the exceptions indicated herein, which were cited in the German Office Action dated May 19, 2008 and/or cited elsewhere are hereby incorporated by reference as if set forth in their entirety herein, as follows: UA 74 721 C2, having the English translation entitled "MACHINE FOR APPLICATION OF LABELS ON THE TANKS," published on Dec. 15, 2005; U.S. Pat. No. 3,235,443 A, having the title "METHOD AND APPARATUS FOR APPLYING LABELS TO CONTAINERS," published on Feb. 15, 1966; JP 04-040257 B2, having the English translation entitled "ROLLING FORMING MACHINE HAVING SIDE GUIDE ON MANDREL," published on Jul. 30, 2002; GB 2 053 740 A, having the title "ADHESIVE APPLICATOR," published on Feb. 11, 1981; and JP 08-133249 A, having the English translation entitled "METHOD AND APPARATUS FOR STICKING SHEET," published on May 28, 1996.

All of the patents, patent applications or patent publications, except for the exceptions indicated herein, which were cited in the International Search Report dated May 19, 2008 and/or cited elsewhere are hereby incorporated by reference as if set forth in their entirety herein, as follows: WO 2005/115847 A, having the English translation entitled "CONTAINER-LABELING MACHINE," published on Dec. 8, 2005.

Some examples of rotation sensors that may possibly be utilized or possibly adapted for use in at least one possible embodiment of the present application may possibly be found in the following U.S. patents: U.S. Pat. No. 6,246,232 issued to Okamura on Jun. 12, 2001; U.S. Pat. No. 6,448,761 issued to Stumpe on Sep. 10, 2002; U.S. Pat. No. 6,474,162 to Voss et al. on Nov. 5, 2002; U.S. Pat. No. 6,498,481 issued to Apel on Dec. 24, 2002; U.S. Pat. No. 6,532,831 issued to Jin et al. on Mar. 18, 2003; and U.S. Pat. No. 6,672,175 issued to Jin et al. on Jan. 6, 2004.

Some examples of stepping motors that may possibly be utilized or possibly adapted for use in at least one possible embodiment of the present application may possibly be found in the following U.S. patents: U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

Some examples of servo-motors that may possibly be utilized or possibly adapted for use in at least one possible embodiment of the present application may possibly be found in the following U.S. patents: U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025,684 issued to Yasui on Feb. 15, 2000.

Some examples of synchronous motors which may possibly be utilized or adapted for use in at least one possible embodiment may possibly be found in the following U.S. patents: U.S. Pat. No. 6,713,899, entitled "Linear synchronous motor;" U.S. Pat. No. 6,486,581, entitled "Interior permanent magnet synchronous motor;" U.S. Pat. No. 6,424,114, entitled "Synchronous motor;" U.S. Pat. No. 6,388,353, entitled "Elongated permanent magnet synchronous motor;" U.S. Pat. No. 6,329,728, entitled "Cylinder-type linear synchronous motor;" U.S. Pat. No. 6,025,659, entitled "Synchronous motor with movable part having permanent magnets;" U.S. Pat. No. 5,936,322, entitled "Permanent magnet type synchronous motor;" and U.S. Pat. No. 5,448,123, entitled "Electric synchronous motor."

Some examples of control valve apparatus that may possibly be utilized or possibly adapted for use in at least one possible embodiment of the present application may possibly be found in the following U.S. patents: U.S. Pat. No. 5,406,975 issued to Nakamichi et al. on Apr. 18, 1995; U.S. Pat. No. 5,503,184 issued to Reinartz et al. on Apr. 2, 1996; U.S. Pat. No. 5,706,849 issued to Uchida et al. on Jan. 13, 1998; U.S. Pat. No. 5,975,115 issued to Schwegler et al. on Nov. 2, 1999; U.S. Pat. No. 6,142,445 issued to Kawaguchi et al. on Nov. 7, 2000; and U.S. Pat. No. 6,145,538 issued to Park on Nov. 14, 2000.

Some examples of electric control valves that may possibly be utilized or possibly adapted for use in at least one possible embodiment of the present application may possibly be found in the following U.S. patents: U.S. Pat. No. 4,431,160 issued to Burt et al. on Feb. 14, 1984; and U.S. Pat. No. 4,609,176 issued to Powers on Sep. 2, 1986.

Some examples of nozzle structures that may possibly be utilized or possibly adapted for use in at least one possible embodiment of the present application may possibly be found in the following U.S. patents: U.S. Pat. No. 6,042,026 issued to Buehler, II on Mar. 28, 2000; U.S. Pat. No. 6,394,366 issued to Adams on May 28, 2002; U.S. Pat. No. 6,402,062 issued to Bendig et al. on Jun. 11, 2002; U.S. Pat. No. 6,616,072 issued to Harata et al. on Sep. 9, 2003; U.S. Pat. No. 6,666,386 issued to Huang on Dec. 23, 2003; and U.S. Pat. No. 6,681,498 issued to Steffan on Jan. 27, 2004.

Some examples of heater arrangements that may possibly be utilized or possibly adapted for use in at least one possible embodiment of the present application may possibly be found in the following U.S. patents: U.S. Pat. No. 6,404,421 issued to Meijler et al. on Jun. 11, 2002; U.S. Pat. No. 6,515,264 issued to Toya et al. on Feb. 4, 2003; No. 6,548,786 issued to Takizawa et al. on Apr. 15, 2003; U.S. Pat. No. 6,555,796 issued to Cusack on Apr. 29, 2003; U.S. Pat. No. 6,633,727 issued to Henrie et al. on Oct. 14, 2003; and U.S. Pat. No. 6,677,557 issued to Ito et al. on Jan. 13, 2004.

Some examples of cutting apparatus that may possibly be utilized or possibly adapted for use in at least one possible embodiment of the present may possibly be found in the following U.S. patents: U.S. Pat. No. 5,060,367 issued to Vandevoorde on Oct. 29, 1991; U.S. Pat. No. 5,091,237 issued to Scloegl et al. on Feb. 25, 1992; U.S. Pat. No. 5,715,651 issued to Thebault on Feb. 10, 1998; U.S. Pat. No. 5,916,343 issued to Huang et al. on Jun. 29, 1999; U.S. Pat. No. 6,502,488 issued to Taylor on Jan. 7, 2003; and U.S. Pat. No. 6,684,599 issued to Fresnel on Feb. 3, 2004.

Some examples of labeling machines which may possibly be utilized in at least one possible embodiment may possibly be found in the following U.S. patents: U.S. Pat. No. 6,634,400, entitled "Labeling machine;" U.S. Pat. No. 6,561,246, entitled "Labeling machine capable of precise attachment of a label to different sizes of containers;" U.S. Pat. No. 6,550,512, entitled "Labeling machine capable of preventing erroneous attachment of labels on containers;" U.S. Pat. No. 6,543,514, entitled "In-line continuous feed sleeve labeling machine and method;" U.S. Pat. No. 6,378,587, entitled "Cylindrical container labeling machine;" U.S. Pat. No. 6,328,086, entitled "Labeling machine;" U.S. Pat. No. 6,315,021, entitled "Labeling machine;" U.S. Pat. No. 6,263,940, entitled "In-line continuous feed sleeve labeling machine and method;" U.S. Pat. No. 6,199,614, entitled "High speed labeling machine having a constant tension driving system;" U.S. Pat. No. 6,167,935, entitled "Labeling machine; U.S. Pat. No. 6,066,223, entitled "Labeling machine and method; U.S. Pat. No. 6,050,319, entitled "Non-round container labeling machine and method;" and U.S. Pat. No. 6,045,616, entitled "Adhesive station and labeling machine."

Some examples of starwheels which may possibly be utilized or adapted for use in at least one possible embodiment may possibly be found in the following U.S. patents: U.S. Pat. No. 5,613,593, entitled "Container handling starwheel;" U.S. Pat. No. 5,029,695, entitled "Improved starwheel;" U.S. Pat. No. 4,124,112, entitled "Odd-shaped container indexing starwheel;" and U.S. Pat. No. 4,084,686, entitled "Starwheel control in a system for conveying containers."

Some examples of pneumatic valves which may possibly be utilized or adapted for use in at least one possible embodiment may possibly be found in the following U.S. patents: U.S. Pat. No. 6,772,791, entitled "Directly operated pneumatic valve having an air assist return;" U.S. Pat. No. 6,729,346, entitled "Pneumatic valve;" U.S. Pat. No. 6,676,107, entitled "Control element, especially a pneumatic valve;" U.S. Pat. No. 6,550,416, entitled "Pneumatic valve device;" U.S. Pat. No. 6,543,481, entitled "Pilot operated pneumatic valve;" U.S. Pat. No. 6,488,050, entitled "Pneumatic valve assembly;" U.S. Pat. No. 6,089,251, entitled "Pneumatic valve;" U.S. Pat. No. 4,526,341, entitled "Pneumatic shut-off valve;" U.S. Pat. No. 4,515,183, entitled "Pneumatic control valve;" and U.S. Pat. No. 4,480,663, entitled "Pneumatic relay valve."

Some examples of blade cutting apparatus and methods that may possibly be utilized or adapted for use in at least one possible embodiment may possibly be found in the following U.S. patent application publications: No. 2003/0146943 A1, entitled "Label Printer-Cutter with Mutually Exclusive Printing and Cutting Operation"; U.S. Pat. No. 5,614,278 entitled "Strip of Separable Labels or Tags Having a Display Surface for Display of Information Thereon"; U.S. Pat. No. 4,189,337, entitled "Real Time Labeler System"; No. 2004/0226659 A1, entitled "Label Application System"; and No. 2004/0226659 A1, entitled "Label Application System".

Some examples of labeling apparatus and methods that may possibly be utilized or adapted for use in at least one possible embodiment may possibly be found in the following U.S. patents: U.S. Pat. No. 4,189,337, entitled "Real Time Labeler System"; No. 2004/0226659 A1, entitled "Label Application System"; U.S. Pat. No. 6,191,382 B1, entitled "Dynamic Laser Cutting Apparatus"; No. 2003/0146943 A1, entitled "Label Printer-Cutter with Mutually Exclusive Printing and Cutting Operation"; and No. 2002/0029855 A1, entitled "System for Printing and Applying Tape onto Surfaces"; U.S. Pat. No. 6,634,400, entitled "Labeling machine;" U.S. Pat. No. 6,561,246, entitled "Labeling machine capable of precise attachment of a label to different sizes of containers;" U.S. Pat. No. 6,550,512, entitled "Labeling machine capable of preventing erroneous attachment of labels on containers;" U.S. Pat. No. 6,378,587, entitled "Cylindrical container labeling machine;" U.S. Pat. No. 6,328,086, entitled "Labeling machine;" U.S. Pat. No. 6,315,021, entitled "Labeling machine;" U.S. Pat. No. 6,199,614, entitled "High speed labeling machine having a constant tension driving system;" U.S. Pat. No. 6,167,935, entitled "Labeling machine; U.S. Pat. No. 6,066,223, entitled "Labeling machine and method; U.S. Pat. No. 6,050,319, entitled "Non-round container labeling machine and method;" and U.S. Pat. No. 6,045,616, entitled "Adhesive station and labeling machine."

Some examples of labels that may possibly be used with a possible embodiment of the present invention may be found in the following U.S. patents: U.S. Pat. No. 5,905,099; U.S. Pat. No. 6,391,415; and U.S. Pat. No. 6,391,415.

U.S. patent application Ser. No. 12/429,427, filed on Apr. 24, 2009, having inventors Lutz DECKERT and Oliver KRESS, Attorney Docket No. NHL-HOL-234, and title "A BEVERAGE BOTTLE OR CONTAINER LABELING DEVICE WITH A CUTTING UNIT AND CUTTING UNIT FOR A BEVERAGE BOTTLE OR CONTAINER LABELING DEVICE," and U.S. patent application Ser. No. 12/352,627, filed on Jan. 13, 2009, having inventors Lutz DECKERT and Oliver KRESS, Attorney Docket No. NHL-HOL-205, and title "A LABELING MACHINE IN A BOTTLE OR CONTAINER FILLING PLANT HAVING A TRANSPORT ROLLER, SUCH AS A CUTTING OR SEVERING ROLLER; AND SUCH A ROLLER FOR LABELING EQUIPMENT OR A LABELING ARRANGEMENT, AS WELL AS LABELING EQUIPMENT OR A LABELING ARRANGEMENT," are hereby incorporated by reference as if set forth in their entirety herein.

Some examples of vacuum transfer drums or vacuum drums, which may possibly be utilized or adapted for use in at least one possible embodiment of the present application, may possibly be found in the following U.S. patents: U.S. Pat. No. 6,347,657, having the title "Lightweight vacuum drum," published on Feb. 19, 2002; U.S. Pat. No. 5,091,040, having the title "Turret type labeling machine with contoured vacuum drum," published on Feb. 25, 1992; U.S. Pat. No. 5,037,499, having the title "Labeling machine combining a turret and a vacuum drum-roll on pad," published on Aug. 6, 1991; U.S. Pat. No. 4,724,036, having the title "Progressively ported vacuum drum for labeling machines," published on Feb. 9, 1988; and U.S. Pat. No. 4,687,535, having the title "Vacuum drum labeling system," published on Aug. 18, 1987.

U.S. patent application Ser. No. 12/787,959, filed on May 26, 2010, having inventors Klaus KRAMER, Lutz DECKERT, and Oliver KRESS, Attorney Docket No. NHL-HOL-272, and title "BEVERAGE BOTTLE FILLING PLANT WITH A BEVERAGE BOTTLE LABELING MACHINE, AND A CUTTING ARRANGEMENT FOR A BEVERAGE BOTTLE LABELING MACHINE," and its corresponding Federal Republic of Germany Patent Application No. DE 10 2007 057 409.8, filed on Nov. 27, 2007, and International Patent Application No. PCT/EP2008/009757, filed on Nov. 18, 2008, and inventors Klaus KRÄMER, Lutz DECKERT, and Oliver KRESS are hereby incorporated by reference as if set forth in their entirety herein.

The patents, patent applications, and patent publications listed above in the preceding paragraphs are herein incorporated by reference as if set forth in their entirety except for the exceptions indicated herein. The purpose of incorporating U.S. patents, Foreign patents, publications, etc. is solely to provide additional information relating to technical features of one or more embodiments, which information may not be completely disclosed in the wording in the pages of this application. However, words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, and patent publications, are not considered to be incorporated by reference herein.

The corresponding foreign and international patent publication applications, namely, Federal Republic of Germany Patent Application No. 10 2007 059 244.4, filed on Dec. 7, 2007, having inventor Lutz DECKERT, and DE-OS 10 2007 059 244.4 and DE-PS 10 2007 059 244.4, and International Application No. PCT/EP2008/010094, filed on Nov. 27, 2008, having WIPO Publication No. WO 2009/071237 A1 and inventor Lutz DECKERT, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, except for the exceptions indicated herein, are hereby incorporated by reference as if set forth in their entirety herein.

The purpose of incorporating the corresponding foreign equivalent patent application(s), that is, PCT/EP2008/010094 and German Patent Application DE 10 2007 059 244.4, is solely for the purpose of providing a basis of correction of any wording in the pages of the present application, which may have been mistranslated or misinterpreted by the translator. However, words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments of the patents, patent applications, and patent publications, are not generally considered to be incorporated by reference herein.

Statements made in the original foreign patent applications PCT/EP2008/010094 and DE 10 2007 059 244.4 from which this patent application claims priority which do not have to do with the correction of the translation in this patent application are not to be included in this patent application in the incorporation by reference.

Any statements about admissions of prior art in the original foreign patent applications PCT/EP2008/010094 and DE 10 2007 059 244.4 are not to be included in this patent application in the incorporation by reference, since the laws relating to prior art in non-U.S. Patent Offices and courts may be substantially different from the Patent Laws of the United States.

All of the references and documents cited in any of the documents cited herein, except for the exceptions indicated herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the description of the embodiment or embodiments, the summary, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Rotor
2 Bottle
3 Label
3a Labeling material
3a.1 Part length of the labeling material 3a
4 Labeling device
5 Container carrier
6, 7 Application of glue
8 Drive
9 Stay
10 Transfer drum
11 Opening for vacuum or compressed air
12 Cutter strip
13 Cutting station
13.1 Blade of the cutting station
14 Infeed unit
15, 16 Rollers
17 Frame
18 Actuator
19 Gluing station
20 Slotted nozzle
20.1 Slot
21 Heated supply hose
22 Valve
23 Mask or screen plate
24 Nozzle housing
25 Glue chamber
26 Closing plate
27 Carrier
A Direction of rotation of rotor
B Direction of rotation of the label transfer drum 10
C Direction of conveyance of the labeling material 3a
D Movement away of the slotted nozzle 20

What is claimed is:

1. A method of labeling containers comprising:
applying glue with a gluing arrangement to a first side of a portion of a strip of label material not in contact with a transfer arrangement, wherein the transfer arrangement includes only a transfer drum, and subsequently feeding said glued portion from said gluing arrangement directly to said transfer arrangement with said first side facing away from said transfer arrangement;

separating said glued portion from said strip and thereby forming an individual label; and transferring said individual label from said transfer arrangement to a container moving past said transfer arrangement.

2. The method of labeling containers according to claim 1, wherein said step of separating said glued portion comprises separating said glued portion from said strip on said transfer arrangement.

3. The method of labeling containers according to claim 2, wherein said transfer arrangement comprises a vacuum drum having a vertical drum axis, and said step of transferring said individual label comprises rotating said vacuum drum about its vertical drum axis.

4. The method of labeling containers according to claim 3, wherein said step of applying glue comprises at least one of:
   intermittently applying at least one application of glue on at least one of a leading end and a trailing end of a label, which at least one application of glue runs substantially parallel to the edge of the leading end or trailing end of said label; and
   applying at least one application of glue extending between a leading end and a trailing end of a label.

5. The method of labeling containers according to claim 4, wherein said step of applying glue comprises using a glue application nozzle, which glue application nozzle comprises a slotted nozzle having several nozzle apertures arranged in a row.

6. The method of labeling containers according to claim 5, wherein said method further comprises feeding said strip of label material past said glue application nozzle such that said strip contacts said glue application nozzle with an application pressure.

7. The method of labeling containers according to claim 6, wherein said method further comprises:
   generating said application pressure by tensioning said strip against said glue application nozzle; and
   upon an interruption in the labeling process, pivoting said glue application nozzle away from said strip of label material.

8. The method of labeling containers according to claim 1, wherein:
   said glue is a hot glue or a hot melt glue; and
   said method further comprises the step of heating a glue application nozzle of said gluing arrangement.

9. The method of labeling containers according to claim 1, wherein:
   said method further comprises feeding said strip of label material adjacent a glue application device and tensioning said portion of said strip against said glue application device such that said portion of said strip is deflected and bent at an angle around said glue application device; and
   said step of applying glue to said portion of said strip comprises dispensing glue from said glue application device onto said strip tensioned against said glue application device.

10. A method of labeling containers comprising:
   feeding a strip of label material adjacent a glue application device and tensioning said strip against said glue application device;
   applying glue to a portion of said strip;
   separating said glued portion from said strip and thereby forming an individual label;
   transferring said individual label using a transfer arrangement to a container moving past said transfer arrangement; and
   wherein said step of applying glue is performed when said portion of said strip is not in contact with said transfer arrangement, and said method further comprises feeding said glued portion to said transfer arrangement subsequent to said step of applying glue.

11. The method of labeling containers according to claim 10, wherein said step of separating said glued portion comprises separating said glued portion from said strip on said transfer arrangement.

12. The method of labeling containers according to claim 11, wherein at least one of (A), (B), and (C):
   (A) said transfer arrangement comprises a vacuum drum having a vertical drum axis, and said step of transferring said individual label comprises rotating said vacuum drum about its vertical drum axis;
   (B) said step of applying glue comprises at least one of:
      intermittently applying at least one application of glue on at least one of a leading end and a trailing end of a label, which at least one application of glue runs substantially parallel to the edge of the leading end or trailing end of said label; and
      applying at least one application of glue extending between a leading end and a trailing end of a label;
   (C) said glue application device comprises a slotted nozzle having several nozzle apertures arranged in a row;
   said glue is a hot glue or a hot melt glue;
   said method further comprises the step of heating said nozzle; and
   said method further comprises pivoting said nozzle away from said strip of label material, upon an interruption in the labeling process.

13. A container labeling apparatus for performing the method according to claim 1, comprising:
   a transfer arrangement configured to transfer a label to a container being moved past said transfer arrangement;
   a glue application device disposed adjacent said transfer arrangement, and configured to apply glue to a first side of a portion of said strip of label material, said portion not being in contact with said transfer arrangement;
   a separator arrangement configured to separate a glued portion from said strip of label material to form a label;
   a feed arrangement configured to feed said strip of label material past said glue application device, and subsequently feed said glued portion directly from said glue application device to said transfer arrangement; and
   said transfer arrangement being configured to transfer said strip of label material with said first side facing away from said transfer arrangement.

14. The container labeling apparatus according to claim 13, wherein said glue application device is disposed upstream of and a distance away from said transfer arrangement in the feed direction of said strip of label material.

15. The container labeling apparatus according to claim 14, wherein said feed arrangement and said transfer arrangement are configured to tension said portion of said strip against said glue application device such that said portion of said strip is deflected and bent at an angle around said glue application device.

16. The labeling apparatus according to claim 15, wherein:
   said separator arrangement comprises at least one cutting arrangement configured to cut labels from said strip of label material;

said glue application device is disposed upstream of said at least one cutting arrangement in a feed direction of said label material;
said glue application device comprises a slotted nozzle; and
said slotted nozzle comprises one of: at least one slot-shaped nozzle opening, and a plurality of nozzle openings arranged in a row.

17. The labeling apparatus according to claim 16, wherein:
said glue application device is configured to dispense hot or heated glue under pressure;
said glue application device is configured to be connected to a pressurized glue supply to receive glue therefrom under pressure;
said at least one slot-shaped nozzle opening and said plurality of nozzle openings are oriented in an axial direction perpendicular or essentially perpendicular to the length dimension of said strip of label material being moved past said glue application device;
said glue application device comprises an electrically or pneumatically actuated control valve to permit controlled or intermittent dispensing of glue;
said transfer arrangement comprises a vacuum drum having a vertical drum axis about which said vacuum drum is configured to rotate;
said at least one cutting arrangement is disposed adjacent the periphery of said vacuum drum and is stationary with respect to said vacuum drum;
said feed arrangement comprises at least one conveyor or infeed unit configured to feed said strip of label material to said vacuum drum; and
said glue application device is disposed between said at least one conveyor or infeed unit and said vacuum drum in the feed direction of said strip of label material.

18. A container labeling apparatus for performing the method according to claim 10, comprising:
a transfer arrangement configured to transfer a label to a container being moved past said transfer arrangement;
a glue application device configured to apply glue to a first side of a portion of said strip of label material, said portion not being in contact with said transfer arrangement;
a separator arrangement configured to separate a glued portion from said strip of label material to form a label;
a feed arrangement configured to feed said strip of label material past said glue application device, and subsequently feed said glued portion to said transfer arrangement;
said feed arrangement and said transfer arrangement are configured to tension said portion of said strip against said glue application device; and
said transfer arrangement being configured to transfer said strip of label material with said first side facing away from said transfer arrangement.

19. A method of labeling containers comprising:
holding, with a transfer arrangement, a portion of an individual label to be formed from a strip of label material;
applying glue to a different portion, not being in contact with said transfer arrangement, of said label to be formed;
separating said label to be formed from said strip and thereby forming a label; and
transferring said label from said transfer arrangement to a container.

20. A container labeling apparatus for performing the method according to claim 19, comprising:
a transfer arrangement configured to hold a portion of an individual label to be formed from a strip of label material;
a glue application device configured to apply glue to a different portion, not being in contact with said transfer arrangement, of said label to be formed;
a separator arrangement configured to separate said label to be formed from said strip and thereby form a label; and
said transfer arrangement being configured to transfer said label to a container.

\* \* \* \* \*